United States Patent
Longhurst et al.

(10) Patent No.: US 9,024,961 B2
(45) Date of Patent: May 5, 2015

(54) COLOR GRADING APPARATUS AND METHODS

(71) Applicant: Dolby Laboratories Licensing Corporation, San Francisco, CA (US)

(72) Inventors: Peter W. Longhurst, Vancouver (CA); Neil W. Messmer, Langley (CA); Steve Margerm, New Westminster (CA); Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 202 days.

(21) Appl. No.: 13/718,896

(22) Filed: Dec. 18, 2012

(65) Prior Publication Data
US 2013/0155330 A1 Jun. 20, 2013

Related U.S. Application Data

(60) Provisional application No. 61/577,647, filed on Dec. 19, 2011.

(51) Int. Cl.
*G09G 5/00* (2006.01)
*G09G 5/02* (2006.01)
(Continued)

(52) U.S. Cl.
CPC . *H04N 9/64* (2013.01); *H04N 9/68* (2013.01); *H04N 9/73* (2013.01)

(58) Field of Classification Search
USPC ......... 345/418, 426, 581, 589, 600, 606, 619, 345/643, 547, 549, 690, 77, 63; 348/223.1, 348/253–254, 552, 560, 606–607, 627, 630, 348/651, 655, 669, 683, 686–687, 701, 708, 348/739; 358/516, 518–520, 523, 525, 530, 358/533, 448, 463; 382/162, 166–169, 254, 382/274, 276, 300
See application file for complete search history.

(56) References Cited

U.S. PATENT DOCUMENTS

| 5,276,779 A | 1/1994 | Statt |
| 6,075,888 A | 6/2000 | Schwartz |

(Continued)

FOREIGN PATENT DOCUMENTS

| GB | 2408872 | 6/2005 |
| JP | 63-061591 | 3/1988 |

(Continued)

OTHER PUBLICATIONS

Wang, J. et al. "Retinex-Based Color Correction for Displaying High Dynamic Range Images" International Conference on Signal Processing Proceedings, p. 1021-1024, 2010 10th International Conference.

(Continued)

*Primary Examiner* — Wesner Sajous

(57) ABSTRACT

A method for color grading input video data for display on a target display comprises obtaining target display metadata indicative of a capability of the target display, obtaining input video data metadata indicative of image characteristics of the input video data, automatically determining initial values for parameters of a parameterized sigmoidal transfer function, at least one of the initial values based at least in part on at least one of the target display metadata and the input video data metadata and mapping the input video data to color-graded video data according to the parameterized transfer function specified using the initial values.

31 Claims, 6 Drawing Sheets

(51) Int. Cl.

| | | |
|---|---|---|
| *G09G 5/36* | (2006.01) | |
| *G09G 3/04* | (2006.01) | |
| *H04N 5/202* | (2006.01) | |
| *H04N 5/00* | (2011.01) | |
| *H04N 5/21* | (2006.01) | |
| *H04N 9/64* | (2006.01) | |
| *H04N 5/52* | (2006.01) | |
| *H04N 1/46* | (2006.01) | |
| *G03F 3/08* | (2006.01) | |
| *G06K 9/40* | (2006.01) | |
| *H04N 9/68* | (2006.01) | |
| *H04N 9/73* | (2006.01) | |
| *G06K 9/00* | (2006.01) | |

(56) References Cited

U.S. PATENT DOCUMENTS

| | | |
|---|---|---|
| 6,335,983 B1 | 1/2002 | McCarthy |
| 6,529,212 B2 | 3/2003 | Miller |
| 6,757,010 B2 | 6/2004 | Fasciano |
| 6,844,881 B1 | 1/2005 | Chen |
| 6,989,859 B2 | 1/2006 | Parulski |
| 7,158,673 B2 | 1/2007 | Nakabayashi |
| 7,289,663 B2 | 10/2007 | Spaulding |
| 7,492,375 B2 | 2/2009 | Toyama |
| 7,599,551 B2 | 10/2009 | Takahashi |
| 7,616,233 B2 | 11/2009 | Steinberg |
| 7,746,411 B1 | 6/2010 | Balram |
| 7,809,200 B2 | 10/2010 | Aguilar |
| 7,844,140 B2 | 11/2010 | Fujita |
| 8,483,479 B2 | 7/2013 | Kunkel |
| 8,831,343 B2 | 9/2014 | Kunkel |
| 2001/0050757 A1 | 12/2001 | Yoshida |
| 2002/0024529 A1 | 2/2002 | Miller |
| 2002/0041287 A1 | 4/2002 | Engeldrum |
| 2002/0075136 A1 | 6/2002 | Nakaji |
| 2002/0080245 A1 | 6/2002 | Parulski |
| 2003/0095197 A1 | 5/2003 | Wheeler |
| 2004/0057061 A1 | 3/2004 | Bochkarev |
| 2004/0183813 A1 | 9/2004 | Edge |
| 2005/0050043 A1 | 3/2005 | Pyhalammi |
| 2005/0123267 A1 | 6/2005 | Tsumagari |
| 2006/0020624 A1 | 1/2006 | Svendsen |
| 2006/0294125 A1 | 12/2006 | Deaven |
| 2007/0065005 A1 | 3/2007 | Cha |
| 2007/0080974 A1 | 4/2007 | Edge |
| 2007/0127093 A1 | 6/2007 | Kuno |
| 2007/0262985 A1 | 11/2007 | Watanabe |
| 2007/0268411 A1 | 11/2007 | Rehm |
| 2008/0080767 A1 | 4/2008 | Cho |
| 2008/0088857 A1 | 4/2008 | Zimmer |
| 2008/0094515 A1 | 4/2008 | Gutta |
| 2008/0170031 A1 | 7/2008 | Kuo |
| 2008/0186707 A1 | 8/2008 | Ku |
| 2008/0225180 A1 | 9/2008 | Callway |
| 2008/0297815 A1 | 12/2008 | Dalrymple |
| 2009/0002561 A1 | 1/2009 | Barnhoefer |
| 2009/0027558 A1 | 1/2009 | Mantiuk |
| 2009/0092325 A1 | 4/2009 | Brown |
| 2009/0115901 A1 | 5/2009 | Winter |
| 2009/0161017 A1 | 6/2009 | Glen |
| 2009/0174726 A1 | 7/2009 | Ollivier |
| 2009/0201309 A1 | 8/2009 | Demos |
| 2009/0267876 A1 | 10/2009 | Kerofsky |
| 2009/0284554 A1 | 11/2009 | Doser |
| 2010/0007599 A1 | 1/2010 | Kerofsky |
| 2010/0008427 A1 | 1/2010 | Chiu |
| 2010/0020242 A1 | 1/2010 | Lammers |
| 2010/0073362 A1 | 3/2010 | Ikizyan |
| 2010/0118008 A1 | 5/2010 | Matsuoka |
| 2010/0128057 A1 | 5/2010 | Doser |
| 2010/0149207 A1 | 6/2010 | Madden |
| 2010/0150457 A1 | 6/2010 | Angell |
| 2010/0158099 A1 | 6/2010 | Kalva |
| 2010/0183071 A1 | 7/2010 | Segall |
| 2010/0195901 A1 | 8/2010 | Andrus |
| 2010/0226547 A1 | 9/2010 | Criminisi |
| 2010/0231935 A1 | 9/2010 | Takenaka |
| 2010/0289810 A1 | 11/2010 | Doser |
| 2010/0289812 A1 | 11/2010 | Kobayashi |
| 2010/0329646 A1 | 12/2010 | Loeffler |
| 2011/0026824 A1 | 2/2011 | Ishii |
| 2012/0026405 A1* | 2/2012 | Atkins et al. ............... 348/651 |
| 2013/0076763 A1* | 3/2013 | Messmer ................. 345/506 |
| 2013/0328907 A1* | 12/2013 | Ballestad et al. ........... 345/590 |
| 2014/0002478 A1* | 1/2014 | Ballestad et al. ........... 345/589 |
| 2014/0078165 A1 | 3/2014 | Messmer |
| 2014/0185930 A1* | 7/2014 | Su et al. .................. 382/166 |

FOREIGN PATENT DOCUMENTS

| | | |
|---|---|---|
| JP | 10294853 | 11/1998 |
| JP | 11-355798 | 12/1999 |
| JP | 2001-251640 | 9/2001 |
| JP | 2002-092655 | 3/2002 |
| JP | 2003-052050 | 2/2003 |
| JP | 2003-248467 | 9/2003 |
| JP | 2006-145577 | 6/2006 |
| JP | 2006-343957 | 12/2006 |
| JP | 2007-318256 | 12/2007 |
| JP | 2007-325134 | 12/2007 |
| JP | 2007-336531 | 12/2007 |
| JP | 2009-017200 | 1/2009 |
| WO | 2010/024782 | 3/2010 |
| WO | 2010/104624 | 10/2010 |
| WO | 2012/118961 | 9/2012 |
| WO | 2012/125802 | 9/2012 |
| WO | 2012/166382 | 12/2012 |

OTHER PUBLICATIONS

Lee, S. et al. "Dynamic Range Compression Algorithm for Mobile Display Devices Using Average Luminance Values" ISIC-2009, 12th International Symposium on Integrated Circuits Proceedings, p. 340-343, Dec. 14, 2009.

Chou, T.R. et al. "Color Calibration of Recovering High Dynamic Range Images" International Conference on Computer Science and Software Engineering, CSSE 2008, v. 6, p. 286-289.

Tamburrino, D. et al. "Digital Camera Workflow for High Dynamic Range Images Using a Model of Retinal Processing" Proc. of SPIE—The International Society for Optical Engineering, v. 6817, 2008.

Gatta, C. et al. "Perceptually Inspired HDR Images Tone Mapping with Color Correction" International Journal of Imaging Systems and Technology, v 17, No. 5, pp. 285-294, 2007.

Li, Xiao-Guang et al. "Algorithm for Visualization of High Dynamic Range Images" Application Research of Computers v. 24, n. 11, 303-5, Nov. 2007.

Mantiuk, R. et al. "High Dynamic Range Image and Video Compression—Fidelity Matching Human Visual Performance" Source: Proc. 2007 IEEE International Conference on Image Processing.

Wei, X. et al. "Performance Evaluation of Color Correction Approaches for Automatic Multi-View Image and Video Stitching" Computer Vision and Pattern Recognition, 2010 IEEE Conference.

Stauder J., et al, "Gamut ID," IET 4th European Conference on Visual Media Production (CVMP 2007), Jan. 2007 p. 22.

Green, P. et al, "How Scalable are Gamut Mapping Algorithms?," Proc. SPIE 5293, Color Imaging IX: Processing, Hardcopy, and Applications, San Jose, CA, Jan. 18, 2004.

Reinhard, E. et al. "Photographic Tone Reproduction for Digital Images", ACM Transactions on Graphics, pp. 267-276, Jul. 2002, Proc. of SIGGRAPH 2002.

Rempel, A.G. et al. "Video Viewing Preferences for HDR Displays Under Varying Ambient Illumination" Proc. of the 6th Symposium on Applied Perception in Graphics and Visualization, 2009, pp. 45-52.

Mantiuk, R. et al. "Display Adaptive Tone Mapping" SIGGRAPH 2008 ACM papers, pp. 1-10.

Smith, K. et al. "Beyond Tone Mapping: Enhanced Depiction of Tone Mapped HDR Images" vol. 25, 2006, No. 3.

(56) References Cited

OTHER PUBLICATIONS

Raffin, M. et al. "Tone Mapping and Enhancement of High Dynamic Range Images Based on a Model of Visual Perception" Proc. of the Tenth IASTED International Conference on Computer Graphics and Imaging, 2008, pp. 190-195.

Cadik, M. et al. "Evaluation of HDR Tone Mapping Methods Using Essential Perceptual Attributes" Computers and Graphics 32 (2008) 330-349.

Mantiuk, R. et al. "A Perceptual Framework for Contrast Processing of High Dynamic Range Images" ACM Trans. Appl Percept. vol. 3, No. 3, 2006.

Drago, F. et al. "Adaptive Logarithmic Mapping for Displaying High Contrast Scenes" EUROGRAPHICS, vol. 22 (2003) No. 3.

Kang, Sing Bing et al. "High Dynamic Range Video" SIGGRAPH ACM, 2003, pp. 319-325.

Ward, G. et al. "JPEG-HDR: A Backwards-Compatible, High Dynamic Range Extension to JPEG" Submitted to 13th Color Imaging Conference, Nov. 2005.

Pouli, T. et al. "Progressive Histogram Reshaping for Creative Color Transfer and Tone Reproduction" Proc. of the 8th International Symposium on Non-Photorealistic Animation and Rendering, 2010, pp. 81-90, published by ACM.

Reinhard, E. et al. "Color Imaging" SIGGRAPH ACM, 2009, pp. 1-239.

Ward, G. et al. "High Dynamic Range Imaging & Image-Based Lighting" SIGGRAPH 2008 ACM, pp. 1-137.

Zhang, J. et al. "An Adaptive Tone Mapping Algorithm for High Dynamic Range Images" Computational Color Imaging: Second International Workshop, Mar. 26-27, 2009, pp. 207-215.

Pattanaik, S. et al. "Adaptive Gain Control for High Dynamic Range Image Display" Proc. of the 18th Spring Conference on Computer Graphics, 2002, pp. 83-87.

Shaw Kevin, "Color Correction, Enhancement and Creativity: Advancing the Craft" Oct. 2005.

Adobe Photoshop "Adobe Photoshop 5.0 Limited Edition, Chapter 4: Making Color and Tonal Adjustments" Jan. 1, 1998, pp. 67-89.

Farbman, Zeev et al. "Edge-Preserving Decompositions for Multi-Scale Tone and Detail Manipulation" ACM Transactions on Graphics: vol. 27, No. 3, Aug. 11, 2008, pp. 1-10.

* cited by examiner

COLOR GRADING APPARATUS AND METHODS

CROSS REFERENCE TO RELATED APPLICATIONS

This application claims priority to U.S. Provisional Patent Application Ser. No. 61/577,647, filed on Dec. 19, 2011, hereby incorporated by reference in its entirety.

TECHNICAL FIELD OF THE INVENTION

The invention relates to color grading of images. Certain embodiments provide improved apparatus and methods for adjusting color and other characteristics of images.

BACKGROUND OF THE INVENTION

Advances in camera and display technology enable images (including both still images and video content) to be captured and displayed with improved precision and greater dynamic range than before. For example, as compared with images captured by older cameras, newer cameras may capture images having:
- larger color gamut;
- greater absolute luminance range (e.g., the range of luminances that can be recorded as distinct values before saturation);
- greater contrast ratio;
- greater resolution;
- more precise output signal formats;
- greater color depth;
- greater luminance depth;
- etc.

Similarly, as compared with images displayed on older displays, images displayed on newer displays may have:
- larger color gamut;
- greater absolute luminance range (e.g., greater maximum brightness);
- greater contrast ratio;
- greater resolution;
- greater color depth;
- greater luminance depth;
- etc.

The rapidity with which advances in camera and display technology occur and the vagaries with which these advances are adopted may lead to the situation where video content is captured by cameras that are less capable than displays on which it is desired to display the video content. Conversely, it may occur that video content is captured by cameras that are more capable than display on which it is desired to display the video content. In either case, it may be desirable to adjust the video content so that it better conforms to the capabilities of the displays (e.g., by expanding or shrinking color gamut, dynamic range, etc.).

The creator of a video production or other image may set tones and colors of pixels in the image so that, when viewed, the image has a desired appearance which agrees with the creator's creative intent. Adjusting tones and colors of pixels in an image may include performing color grading (or 'color timing') on the source video data. Color grading may be performed using a hardware/software system (sometimes referred to as a color grading station) that permits a user (sometimes referred to as a color grader or colorist) to change the video data in various ways to achieve a desired appearance. Color grading may involve manual user input (e.g., in the case of pre-recorded video productions) or may be performed automatically according to pre-determined parameters (e.g., in the case of live broadcasts).

Color grading may be used to adjust the video content to fit more or less capable displays. Where there is a mismatch between the capabilities of a camera used to capture video content and the display used in color grading, it may be difficult and/or time consuming to adjust the video content to fit the capabilities of the display using existing color grading tools. Color grading video content captured by more capable cameras using existing color grading tools may be difficult even where the capabilities of the cameras and displays are not mismatched. For example, offset, gain, gamma adjustments heretofore used in color grading may provide less intuitive control and yield less satisfactory results in the context of video content having high dynamic range (the term "high dynamic range" means dynamic ranges of 800:1 or more) or relatively high maximum luminance (e.g., maximum luminance greater than 1000 nits).

Similar difficulties may be encountered when video content color graded for display on one display (e.g., a reference display) is subsequently color graded for display on a different display (e.g., a target display).

Accordingly, there is a desire for improved color grading methods and apparatus.

BRIEF DESCRIPTION OF DRAWINGS

The drawings show non-limiting example embodiments. More particularly.

DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Interpretation of Terms

Unless the context clearly requires otherwise, throughout the description and the claims:
- "comprise," "comprising," and the like are to be construed in an inclusive sense, as opposed to an exclusive or exhaustive sense; that is to say, in the sense of "including, but not limited to".
- "connected," "coupled," or any variant thereof, means any connection or coupling, either direct or indirect, between two or more elements; the coupling or connection between the elements can be physical, logical, or a combination thereof.
- "herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Figure 1:
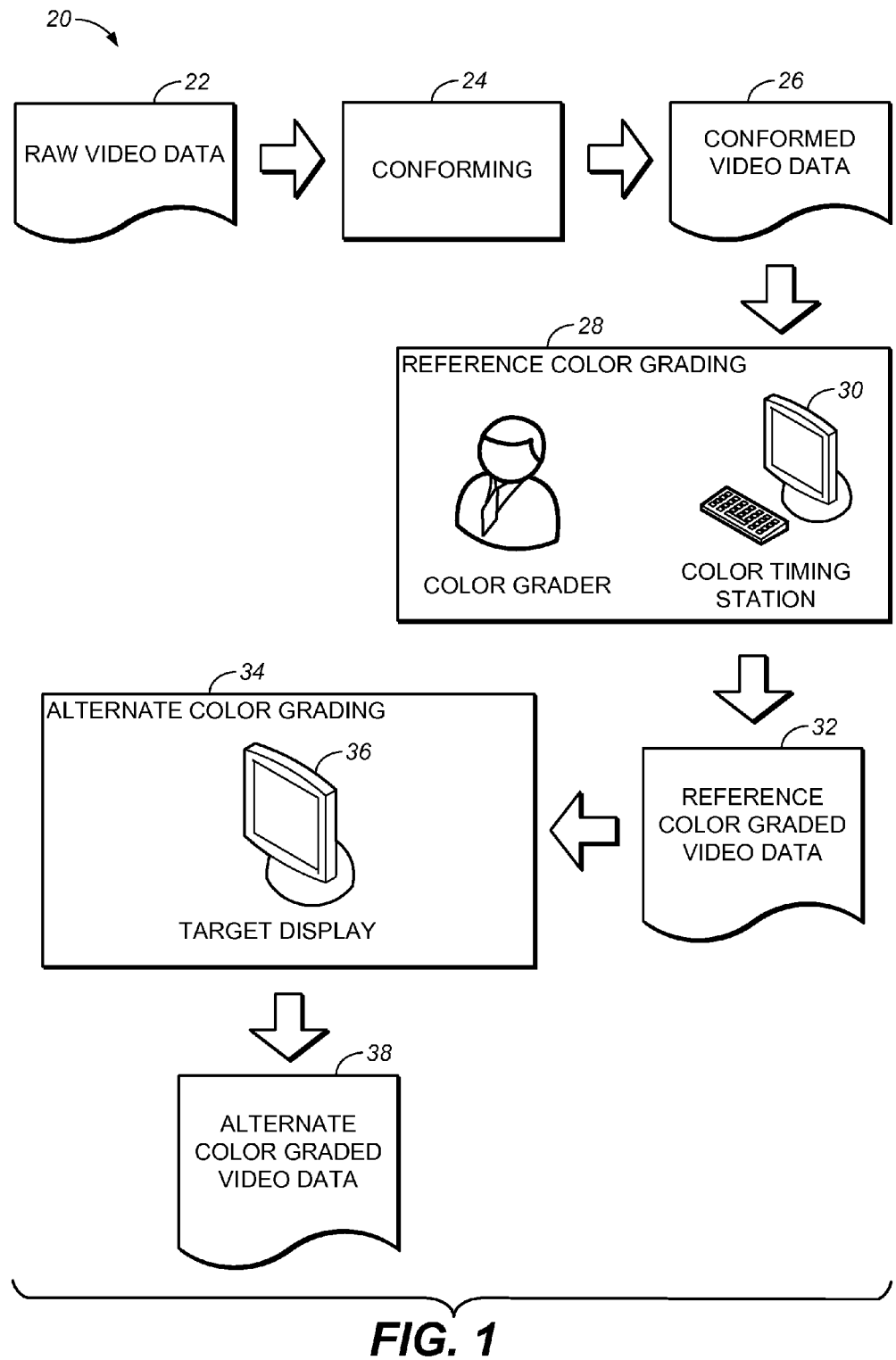
FIG. 1 is a schematic diagram of a video production workflow.

FIG. 1 shows schematically an example video production workflow 20. Raw video data 22 is acquired and conformed at a conforming stage 24 to provide conformed video data 26. Raw video data 22 may comprise video data acquired from different sources (e.g., captured from different cameras, captured by the same camera under different conditions, scanned from legacy video media, computer generated, etc.). Conforming stage 24 converts the raw video data 22 from any of a number of such different sources to a common format, color space and tonal range. Tones and/or colors in conformed video data 26 are adjusted in a reference color grading stage 28. Reference color grading stage 28 may be performed by a color grader (e.g. a human who uses tools provided by the color timing station by way of a suitable user interface) using a color timing station to produce reference color graded video data 32, or may be performed automatically according to pre-determined parameters (e.g., in the case of live broadcasts) to produce reference color graded video data 32. The color timing station may include a professional monitor 30 on which the color grader views images specified by the video data being color graded. Using tools and controls provided by the color timing station, the colorist adjusts tones and/or colors of all or parts of the images which make up the video production to achieve an overall appearance which, when viewed on display 30, matches the colorist's artistic intent.

Alternate color grading stage 34 may be performed on reference color graded video data 32 to produce alternate color graded video data 38. Alternate color grading 34 is performed with a view to ensuring that the appearance of alternate color graded video data 38 on a particular target display 36 meets certain criteria. For example, ensuring that the artistic intent of the color grader who performed reference color grading 28 is substantially preserved when alternate color graded video data 38 is displayed on target display 36 may be an objective of alternate color grading 34. Alternate color grading 34 may be performed automatically (e.g., without human intervention), by a color grader, or by a combination of automatic and manual operations.

Color grading is typically an iterative process. A color grader makes adjustments to video data, views the adjusted video data on a monitor (e.g., professional monitor 30), and makes further adjustments based on the appearance of video data. Since the capabilities of the color grading monitor limit what adjustments to video data can be perceived by the color grader, the color grading monitor determines the freedom that a color grader has to express her artistic intent. That is to say, a relatively more capable color professional monitor 30 will enable the color grader to explore a relatively broader realm of aesthetic possibility.

Where the dynamic range of professional monitor 30 exceeds the dynamic range of conformed video data 26, a color grader may have to make relatively large adjustments to conformed video data 26 in order to explore the aesthetic possibilities that professional monitor 30 can display (in colloquial terms, conformed video data 26 may have to be "pushed" to the limits of display 30). Large adjustments to conformed video data 26 may also be required where the dynamic range of conformed video data 26 exceeds the dynamic range of professional monitor 30. For example, where the dynamic range of conformed video data 26 exceeds the dynamic range of professional monitor 30, adjustments to displayed video data may be required to reduce or eliminate clipping, banding or other undesirable visual artefacts that appear when video data is displayed (in colloquial terms, to conformed video data 24 may have to be "pulled" into a range that can be displayed on monitor 30). Similar consideration apply, mutatis mutandis, in alternate color grading stage 34 where the capabilities of professional monitor 30 and target display 36 are different. Making relatively large adjustments to conformed video data 26 may be time consuming Making relatively large adjustments to conformed video data 26 can potentially introduce undesirable distortions in the video data being color graded. The risk of introducing undesirable distortions in the video data, which may be difficult to correct, may be particularly acute where the color grading is performed using offset, gain and gamma adjustments. For example, where the dynamic range of video data is expanded using offset, gain and/or gamma adjustments, it may be particularly difficult to preserve the mid-range contrast of the source video data.

Figure 2:
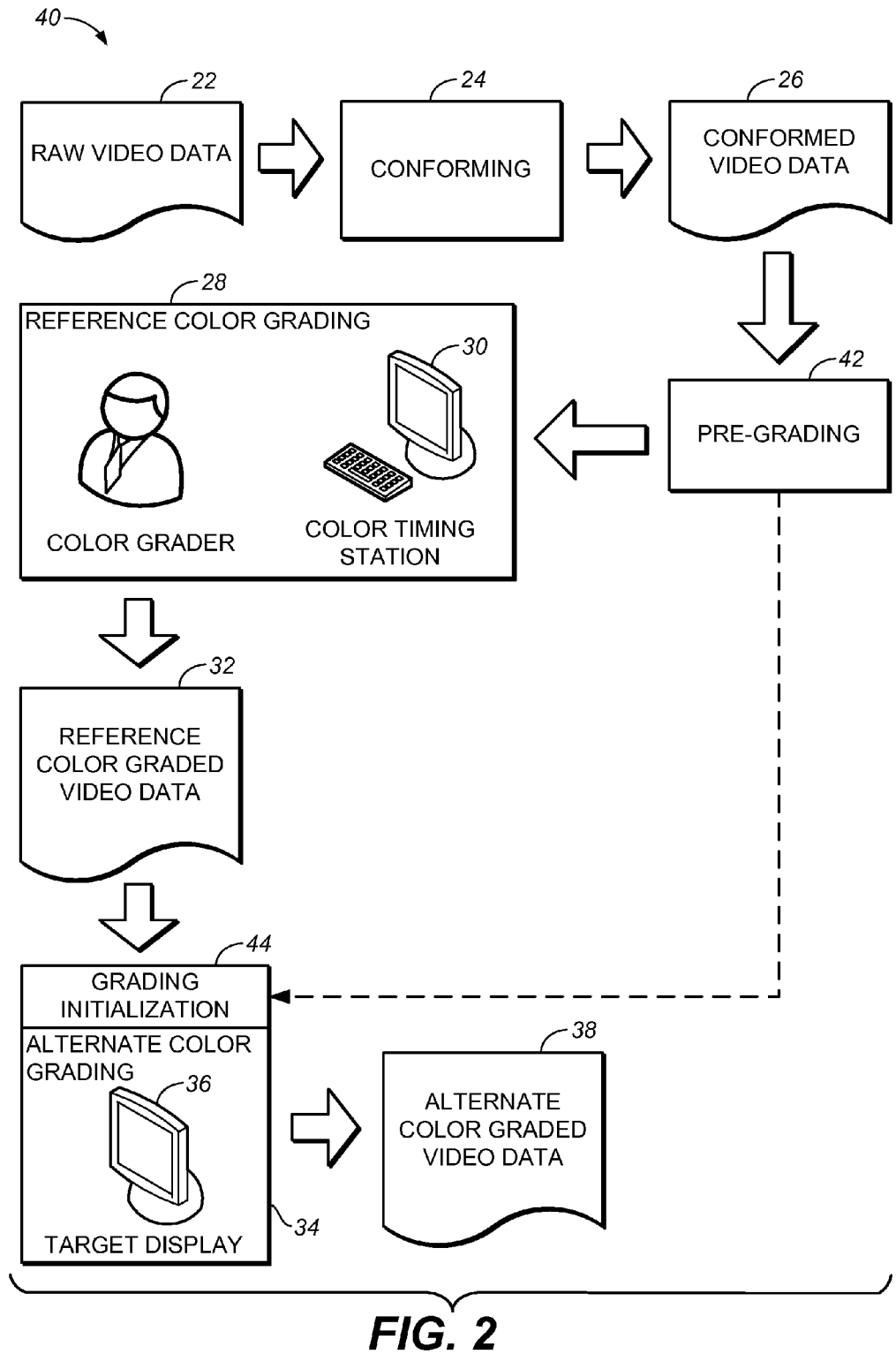
FIG. 2 is a schematic diagram of a video production workflow according to an example embodiment.

FIG. 2 is a schematic diagram of a video production workflow 40 according to an example embodiment. Workflow 40 comprises components of workflow 20, and like reference numbers are used to denote like components. Workflow 40 comprises pre-grading stage 42 and grading initialization 44. Pre-grading stage 42 and grading initialization 44 at least partially automatically (e.g., without human intervention) adjust input video data (conformed video data 24 and reference color graded video data 32, respectively), to match, at least approximately, the capabilities of a destination display (professional display 30 and target display 36, respectively). Automatic adjustments applied in pre-grading stage 42 and grading initialization 44 may reduce the amount of manual adjustments necessary to achieve the aims of reference color grading stage 28 and alternate color grading stage 34.

At least some of the automatic adjustments applied in pre-grading stage 42 and grading initialization 44 comprise mappings according to parameterized transfer function(s). Advantageously, such parameterized transfer function may be characterized by a plurality of fixable points, which may be referred to as 'control points', and a free parameter that adjusts a slope of the transfer function in a mid-range region. This slope corresponds to mid-range contrast. The mid-range region of the transfer function may be linear in log-log space or approach linearity in log-log space.

Figure 3:
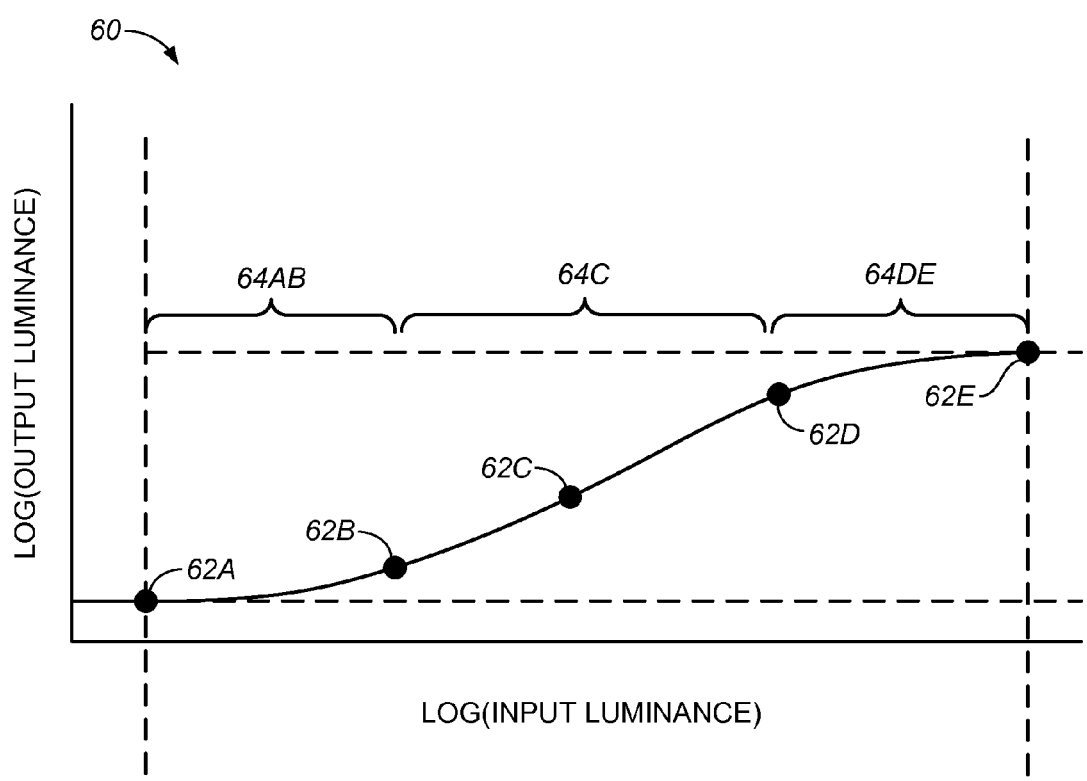
FIG. 3 is a graph of transfer function according to an example embodiment.

FIG. 3 shows an example transfer function 60, which may be used to map video data in pre-grading stage 42 or grading initialization 44. In FIG. 3, input values are indicated on the horizontal axis and output values are indicated on the vertical axis. Each axis has a logarithmic scale. Transfer function 60 is monotonically increasing, sigmoidal, and may be characterized by a plurality of parameters. In some embodiments, transfer function 60 is characterized by a set of five points, namely:

a minimum extremity control point 62A,
a footroom control point 62B, an mid-tone control point 62C,
a headroom control point 62D, and
a maximum extremity control point 62E.

Each point is defined by input luminance (represented by the point's horizontal position) and output luminance (represented by the point's vertical position. Transfer function 60 may also be characterized by the slope at mid-tone control point 62C. In some embodiments, transfer function 60 may also be characterized by slope at one or both of minimum extremity control point 62A and maximum extremity control point 62E. Transfer function 60 illustrates an example for mapping input luminance values to output luminance values, although it is to be understood that similar transfer functions may be used for mapping color values.

In the illustrated example, transfer function 60 comprises a substantially linear (in log-log space) mid-tone region 64C about mid-tone control point 62C. The substantial linearity of mid-tone region 64C results in transfer function 60 preserving dynamic range of the mid-tones of input video data 56. The slope of transfer function 60 in mid-tone region 64C may be adjustable with a free parameter. The slope of mid-tone region 64C corresponds to mid-range contrast. Adjustment of the free parameter provides a means for controlling mid-range contrast.

Transfer function 60 comprises a substantially concave upward region 64AB between minimum extremity control point 62A and footroom control point 62B. The position of footroom control point 62B relative to minimum extremity control point 62A provides control over the "sharpness" of the roll-off at the bottom (darker) end of the transfer function. A footroom control point 62B that is relatively further away from minimum extremity control point 62A along the horizontal axis results in transfer function 60 mapping more low luminance levels of input video data 54 to the range of output luminance levels defined by the vertical separation between footroom control point 62B and minimum extremity control point 62A, which decreases contrast in the darker regions of input video data 54. A footroom control point 62B that is relatively further away from minimum extremity control point 62A along the vertical axis results in transfer function 60 mapping low luminance levels of input video data 56 to a broader the range of output luminance levels, which increases contrast in the darker regions of input video data 54.

Transfer function 60 comprises a substantially convex upward region 64DE between headroom control point 62D and maximum extremity control point 62E. The position of headroom control point 62D relative to maximum extremity control point 62E provides control over the "sharpness" of the roll-off at the top (brighter) end of the transfer function. A headroom control point 62D that is relatively further away from maximum extremity control point 62E along the horizontal axis results in transfer function 60 mapping more high luminance levels of input video data 54 to the range of output luminance levels defined by the vertical separation between headroom control point 62D and maximum extremity control point 62E, which decreases contrast in the brighter regions of input video data 54. A headroom control point 62D that is relatively further away from maximum extremity control point 62E along the vertical axis results in transfer function 60 mapping high luminance levels of input video data 56 to a broader the range of output luminance levels, which increases contrast in the brighter regions of input video data 54.

In some embodiments, transfer function 60 is specified by a computable function of parameter values. Coordinates of control points 62A-E and the slope at mid-tone control point 62C may correspond to these parameter values, or be determinable as a computable function of thereof. In some embodiments, an invertable computable function relates the coordinates of at least some of control points 62A-62E to one or more input parameters of a computable function that specifies transfer function 60. It will be understood that where control points characterizing a transfer function are adjusted, parameters defining a transfer function (e.g., in a mathematical sense) may be adjusted correspondingly.

Adjustments applied in pre-grading stages 42 and grading initialization 44 may be determined, at least partially, automatically based metadata. Metadata may be obtained from an external source (e.g., a data store, a side channel to input video data, etc.) or may be obtained from analysis of input video data. In some embodiments, metadata obtained in pre-grading stage 42 is used in grading initialization 44.

Figure 4:
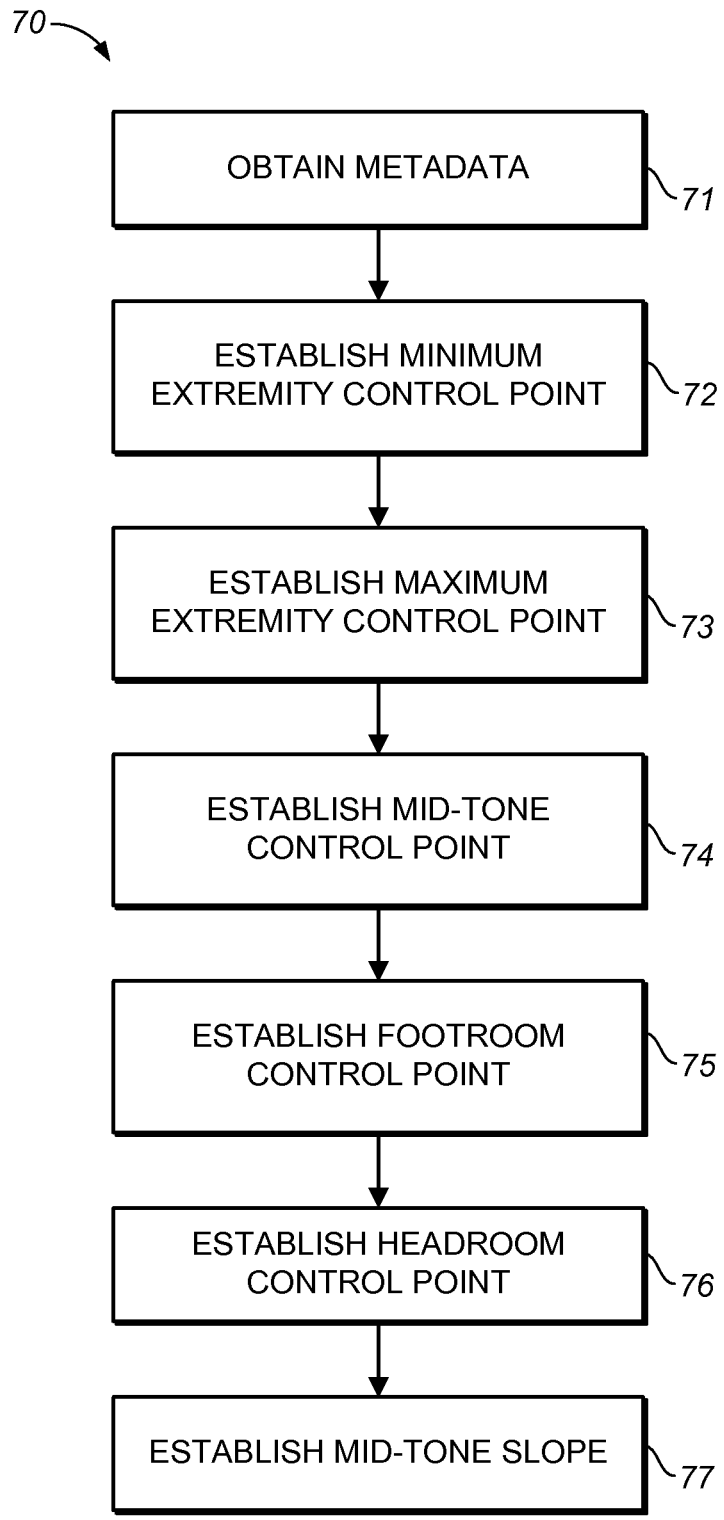
FIG. 4 is a method according to an example embodiment for automatically establishing control points characterizing a transfer function.

One method for automatically establishing control points characterizing transfer function 60 in a specific case is illustrated by the method 70 of FIG. 4. Pre-grading stage 42 and grading initialization 44 may comprise performing method 70. Method 70 uses information about the destination display and information about the input video data to determine appropriate values for control points that define transfer function 60. In some embodiments, method 70 is applied to establish the control points characterizing transfer function 60 on a scene-by-scene basis.

In step 71, metadata is obtained. Step 71 may comprise obtaining metadata from an external source, for example. Non-limiting examples of types of metadata that may be acquired from external sources include:
  destination display characteristics (e.g., minimum luminance (black level), maximum luminance (white level), middle grey level, gamut boundary, etc.);
  video data acquisition parameters (e.g., light level, exposure, lens aperture, light sensor sensitivity (ISO), etc.);
  intended viewing environment (e.g., ambient lighting, background lighting, viewing distance, etc.); and
  the like.

In some embodiments, step 71 comprises extracting metadata from video data to which transfer function 60 is to be applied. Some Example methods for extracting metadata from video data are described below. Non-limiting examples of metadata that may be extracted from video data include:
  luminance histograms;
  light luminance levels;
  highlight luminance levels;
  low-level noise floor;
  foot room;
  head room;
  mid level;
  statistical measures of video data (e.g., geometric mean, logarithmic mean, median, etc.)
  feature maps (e.g. light sources, salient features, etc.);
  luminance ranges for protected chromaticities (e.g., skin tone etc.); and
  the like.

Step 72 establishes minimum extremity control point 62A. The vertical coordinate (output value) of minimum extremity control point 62A may be determined as the black level of the destination display, for example. The horizontal coordinate (input value) of minimum extremity control point 62A may be determined as a small percentile (e.g. the 0.1 percentile) of the luminance channel in the input signal.

Step 73 establishes maximum extremity control point 62E. The vertical coordinate (output value) of minimum extremity control point 62A may be determined as the white level of the destination display. The horizontal coordinate (input value) of maximum extremity control point 62E may be determined as a maximum luminance for input video data 54.

Step 74 establishes mid-tone control point 62C. The position of a middle control point 62C affects the overall brightness of a displayed image (e.g. the 'key' of the image). Appropriate selection of mid-tone control point 62C facilitates the input image being perceived as being appropriately bright on the destination display. The horizontal value (input value) for point 62C may be determined in various ways, such as:
- calculating a central tendency statistic (e.g., geometric mean, logarithmic geometric mean, or the like) of luminance of input video data 56, and determining the horizontal value for point 62C based at least in part on this statistic;
- based on salient features (e.g., could be set to be within a predetermined range of one or more salient features in input video data 56);
- identifying pixels of input video data 56 having chromaticities consistent with protected colors such as, for example, skin-tone, calculating a central tendency statistic of luminance of these pixels, and determining the horizontal value for point 62C based at least in part on this statistic;
- calculating the logarithmic average of the horizontal values for minimum extremity control point 62A and maximum extremity control point 62B, and determining the horizontal value for point 62C based at least in part on this average.

The vertical value (output value) for point 62C may be based on a luminance level corresponding to middle grey for the destination display. For example, in a display that can produce luminance values between 1 cd/m$^2$ and 400 cd/m$^2$, middle grey is approximately 20 cd/m$^2$ (which is logarithmically half-way between 1 and 400 cd/m$^2$). An appropriate value for point 62C may therefore be a value corresponding to middle grey (e.g. about 20 cd/m$^2$ in this example).

In some embodiments, the mid-tone control point 62C is selected so as to make the ratio of the coordinate of the mid-tone control point to the coordinate of the extremity control point equal, within a desired factor, for both the input (horizontal coordinate) and output (vertical coordinate) of the transfer function.

Step 75 establishes footroom control point 62B. The horizontal value for point 62B may be set in various ways, such as:
- determining an input luminance level beneath which low luminance camera noise is visible, and setting the horizontal value of footroom control point 62B at or above this input luminance level;
- obtaining a luminance histogram for the input video data and setting the horizontal value of footroom control point 62B at or above the input luminance of a predetermined lower percentile of the histogram (e.g., the 5th percentile; the predetermined lower percentile may be user adjustable in some embodiments);
- setting the horizontal value of footroom control point 62B according to a monotonically increasing function of the exposure used to capture of the video data (e.g., as a monotonically increasing function of lens aperture, as a monotonically decreasing function of shutter speed, as a monotonically increasing function of light sensor sensitivity (ISO)). For example, if the camera used to capture the video data was set for greater exposure, it may be assumed that the cinematographer's intent was to capture more dark detail, and footroom control point 62B may be set to provide less compression of low luminance levels and provide a more gentle roll-off.

The vertical value for footroom control point 62B may be selected so its ratio to the vertical value of the minimum extremity control point 62A is the same as the ratio of the horizontal values of footroom control point 62B and minimum extremity control point 62A.

Step 76 establishes headroom control point 62D. The horizontal value for point 62D may be set in various ways, such as:
- determining an input luminance level above which pixels are presumed to be to light sources (e.g., by identifying light sources using a light source detection algorithm and determining the minimum luminance value of pixels determined to belong to light sources) and setting the horizontal value of headroom control point at or below this input luminance level;
- obtaining a luminance histogram for the input video data and setting the horizontal value of headroom control point 62D at or below the input luminance of a predetermined higher percentile of the histogram (e.g., the 95th percentile; the predetermined higher percentile may be user adjustable in some embodiments);
- setting the horizontal value of headroom control point 62D according to a monotonically decreasing function of the exposure used to capture of the video data (e.g., as a monotonically decreasing function of lens aperture, as a monotonically increasing function of shutter speed, as a monotonically decreasing function of light sensor sensitivity (ISO)). For example, if the camera used to capture the video data was set for less exposure, it may be assumed that the cinematographer's intent was to avoid overexposure clipping, and headroom control point 62D may be set to provide less compression of high luminance levels and provide a more gentle roll-off.

The vertical value for headroom control point 62D may be selected so its ratio to the vertical value of the maximum extremity control point 62E is the same as the ratio of the horizontal values of headroom control point 62D and maximum extremity control point 62E.

Step 77 establishes a free parameter n which controls the mid-tone slope of transfer function 60. In some embodiments n is set to 1. When n is set to 1, the application of transfer function 60 to input video data does result in substantially no dynamic range compression or expansion in the mid-tone range. In some embodiments n may be greater than or less than 1.

[The order of steps 72-77 in method 70 may vary from the order shown in the illustrated example of FIG. 4. Also, in some embodiments, two or more of steps 72-77 may be performed at the same time in parallel.

In some embodiments, method 70 may be adapted to determine parameters of a sigmoidal transfer function for a plurality of color channels. For example, in an RGB color space, method 70 may determine parameters analogous to points 62A-E and parameter n for each of the R, G and B color channels based on luminance for that color channel in input video data 56.

In some embodiments, adjustments applied in pre-grading stages 42 and grading initialization 44 are guided by high-level input from a color grader. For example, a color grader may identify one or more salient regions of video data image(s). Salient regions may comprise image features whose perception by viewers is judged important by the color grader, for example. In some embodiments, a luminance histogram for salient regions is computed, and the horizontal values for footroom control point 62B and headroom control point 62D are set according to, or based at least in part on, luminance values at predetermined percentiles in the luminance histogram for the salient regions (e.g., the 1st and 99th percentiles). In some embodiments, one or more statistics of luminance values in the salient region(s) are computed, and the horizontal values of footroom control point 62B, mid-tone control point 62C and/or headroom control point 62D are set based at least in part on these statistic(s). For example, the horizontal value of footroom control point 62B may be determined as the luminance at three geometric standard deviations below the geometric mean of luminance, and the horizontal value of headroom control point 62D may be determined as the luminance at three geometric standard deviations above the geometric mean of luminance.

In some embodiments, adjustments applied in pre-grading stages 42 and grading initialization 44 are guided by a color grader's selection of one or more particular methods for automatically determining values for parameters of a transfer function. For example, a color grader may be presented with a menu of different options for automatically determining the horizontal value for footroom control point 62B (e.g., comprising two or more of the example ways for setting footroom control point 62B above), and footroom control point 62B may be set according to option selected by the color grader.

A color grader may be assisted in her selection of options for determining values for transfer function parameters by sample images obtained by the application of transfer functions defined by values determined according to particular options. For instance, a baseline set of parameters for a transfer function may be assumed and a sample image obtained by applying a transfer function, as defined by the baseline set of parameters, to input video data, and the sample image displayed to the color grader. In response to the color grader's selection of a different option for determining a value for a parameter of the transfer function, the transfer function, as defined by the value for the parameter determined according to the different option, is applied to the input video data and the sample image obtained thereby displayed to the color grader.

Figure 5:
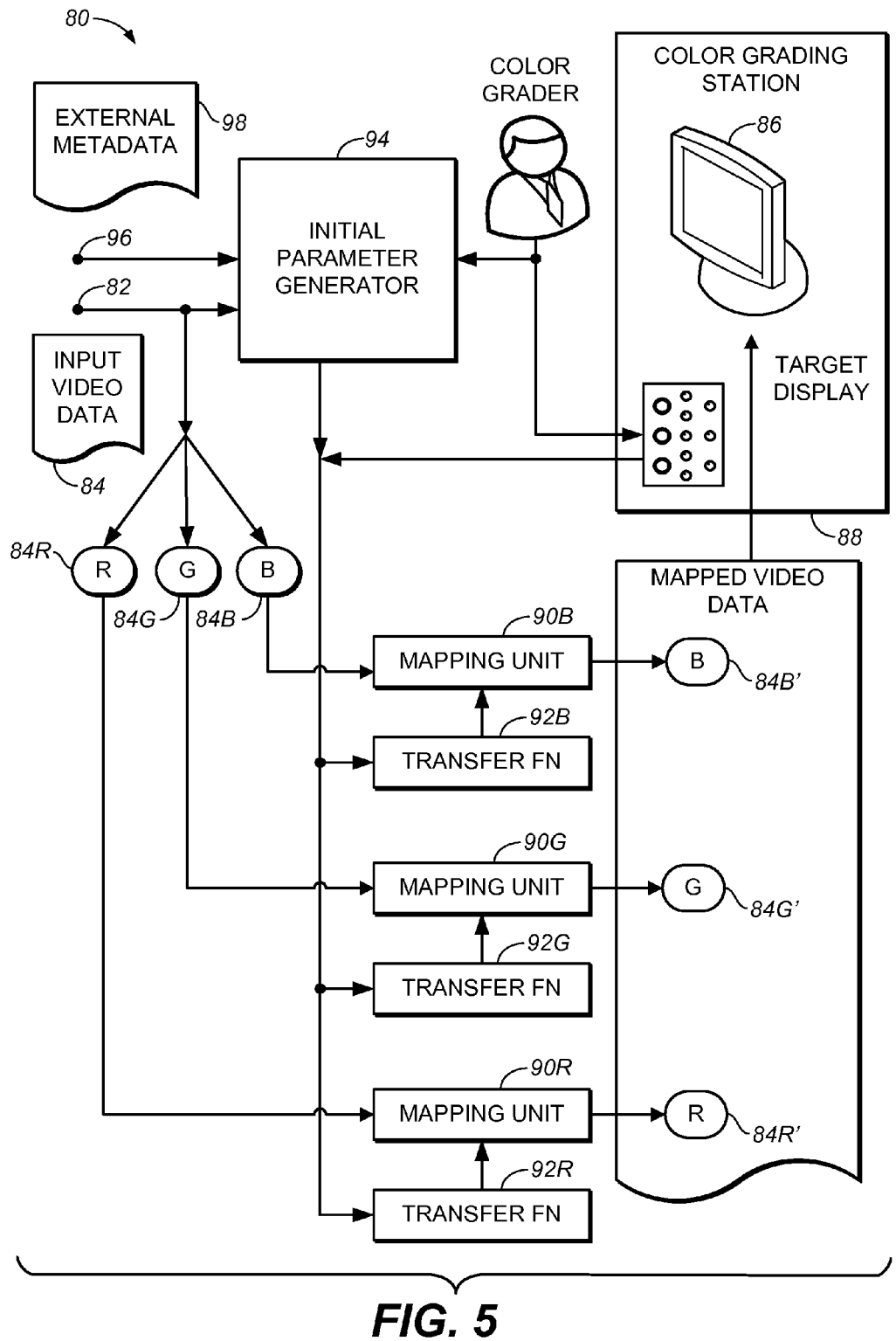
FIG. 5 is a schematic diagram of an apparatus for mapping video data according to an example embodiment.

Reference color grading 28 and alternate color grading 34 may comprise manually adjusting parameters of a transfer function applied in pre-grading 42 or grading initialization 44, respectively. FIG. 5 is a schematic diagram of an apparatus 80 according to an example embodiment for mapping video data according to an adjustable, parameterized transfer functions.

In this example, apparatus 80 has an input 82 for receiving video data 84 to be displayed on a target display 86 of a color grading station 88. Video data 84 may comprise raw video data, conformed video data, or color-timed video data embodying the intent of a creator. In the illustrated embodiment, video data 84 is provided in the native color space of target display 86. Apparatus 80 may comprise a color space translator (not shown) that translates pixel values for video data 84 specified in a color space other than the native color space of display 86 into the native color space of target display 86.

In the illustrated example embodiment, the native color space of target display 86 is an RGB color space, which specifies colors in terms of the intensities of primary colors of target display 86. Video data 84 comprises values 84R, 84G, and 84B which respectively correspond to red, green and blue (RGB) primaries of target display 86.

Each of values 84R, 84G, and 84B is independently mapped to a new value by a mapping unit 90. Mapping units 90R, 90G, and 90B are shown. Each mapping unit maps a corresponding input value from video data 84 to a transformed value. In the illustrated embodiment, the transformed values are indicated by 84R', 84G' and 84B' respectively.

Each mapping unit 90 maps its input value to an output value according to a parameterized transfer function 92 (individually labelled as transfer functions 92R, 92G and 92B in FIG. 5). Advantageously, each transfer function 92 may be characterized by a plurality of fixable points, which may be referred to as 'control points', and a free parameter that adjusts a slope of the transfer function in a mid-range region. Transfer functions 92 may, for example, be substantially similar to transfer function 60 as discussed above, and parameters therefor may be determined in substantially the same as for transfer function 60 as discussed above.

The transfer functions 92R, 92G and 92B applied to red, green and blue channel signals by mapping units 90R, 90G and 90B may be identical or different. Mapping units 90R, 90G and 90B may be independent or may share hardware and/or software components.

Transfer functions 92R, 92G and 92B may initially be characterized by initial control points determined by initial control point generator 94. Control point generator 94 is configured to determine control points that characterize transfer function 92R, 92G and 92B at least partially automatically. Control points generated by control point generator 94 may correspond to parameters that define transfer functions 92R, 92G and 92B.

In some embodiments, control point generator 94 is configured to determine control points that characterize transfer functions 92R, 92G and 92B automatically (i.e., without user intervention). For example, control point generator 94 may be configured to determine control points of transfer function 60 according to any or any combination of the methods discussed above in relation to the control points 62A-E. Control point generator 94 may have an input 96 for receiving external metadata 98, and be configured to determine initial control points based at least in part on external metadata 98. In some embodiments, control point generator 94 is configured to extract metadata from input video data 84, and is configured to determine initial control points based at least in part on such extracted metadata.

In some embodiments, initial control point generator 94 is configured to generate other information characterizing transfer functions 92R, 92G and 92B, such as mid-tone slope, for example.

In some embodiments, the determination of control points that characterize transfer function 92R, 92G and 92B by control point generator 94 is guided at a high-level by input from a color grader, such as by identification of salient regions, selection of particular methods for automatically determining parameter values, and the like.

Color grading station 88 comprises a control interface 100. Control interface 100 comprises controls for adjusting transfer functions 92R, 92G, 92B. A color grader may manipulate the controls of control interface 100 to adjust transfer functions 92R, 92G and 92B. In some embodiments, the control interface 100 may be used to refine initial control points characterizing transfer functions 92R, 92G and 92B determined by initial control point generator 94. Such refinement of initial control points may reduce, or even eliminate, the need for further color grading adjustments (e.g., such as adjustment that would otherwise need to be applied in reference color grading 28 and/or alternate color grading 34).

Figure 6:
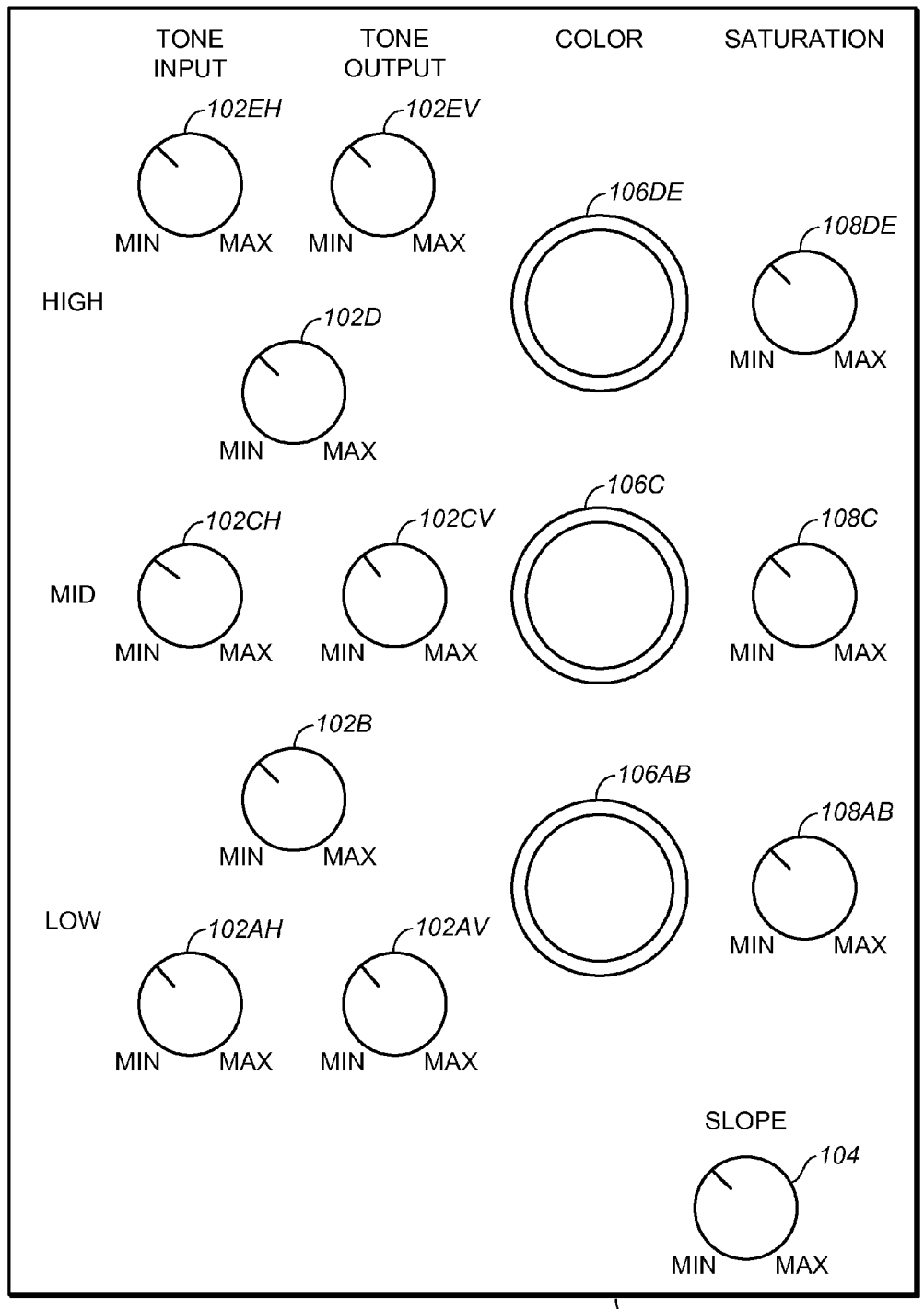
FIG. 6 is a schematic diagram of a control interface according to an example embodiment.

A particular example embodiment of control interface 100 is shown in FIG. 6. Control interface 100 is adapted for adjusting the values of parameters of red, green and blue color channel transfer functions of the same type as transfer function 60 discussed above. In the illustrated embodiment, control interface 100 comprises the following controls:

single degree of freedom control point horizontal value controls 102AH, 102CH and 102EH (dials in the illustrated example embodiment), operable to adjust values which correspond to horizontal values of control points 62A, 62C and 62E, respectively;

single degree of freedom control point vertical value controls 102AV, 102CV and 102EV (dials in the illustrated example embodiment), operable to adjust values which correspond to vertical values of control points 62A, 62C and 62E, respectively;

single degree of freedom control point controls 102B and 102D (dials in the illustrated example embodiment), operable to adjust values which correspond to parameters control points 62B and 62D;

single degree of freedom mid-tone slope control 104 (a dials in the illustrated example embodiment), operable to adjust a value which corresponds to the slope in mid-tone range 64C;

two degree of freedom color balance controls 106AB, 106C and 106DE (trackballs in the illustrated example embodiment), which are operable to adjust color balance in ranges 64AB, 64C and 64DE (e.g., by adjusting points corresponding to all of points 62B, 62C and 62D together in transfer functions for one or more color channels, or by shifting transfer functions for one or more color channels horizontally relative to each other); and single degree of freedom saturation controls 108AB, 108C, and 108DE (dials in the illustrated example embodiment), which are operable to adjust color saturation in ranges 64AB, 64C and 64DE.

In the illustrated example embodiment, control interface 100 is linked to control points that characterize transfer functions 92R, 92G and 92B such that manipulation of tone controls 102 adjusts transfer functions 92R, 92G and 92B in the same manner. As a result, in this embodiment, color balance may be substantially maintained.

In the illustrated example embodiment, control interface 100 is linked to control points that characterize transfer functions 92R, 92G and 92B such that manipulation of color balance controls 106 adjusts transfer functions 92R, 92G and 92B differently. For instance, the manipulations of controls 106 may adjust transfer functions 92R, 92G and 92B to change color balance in a vector manner. In an example embodiment, input ($\delta x$, $\delta y$) to a color balance control 106 maps to changes to parameters corresponding to control points 62B, 62C and 62D of transfer functions 92R, 92G and 92B according to the following relationship:

$$\delta R = 1.5749 \delta y \quad (1)$$

$$\delta G = -0.18734 \delta x - 0.468124 \delta y \quad (2)$$

$$\delta B = 1.8556 \delta x \quad (3)$$

Some embodiments provide particular control schemes by which manipulations of the controls of control interface 100 affect control points characterizing of transfer functions 92R, 92G and 92B. In some schemes, control points are coupled, such that manipulation of a control corresponding to one control point causes, at least in some circumstances, the one control point and at least one other linked control point to be adjusted. The following are examples of such linking applicable to the example embodiment in which transfer functions 92R, 92G and 92B have the form of transfer function 60:

Manipulations of control 102AV adjust the vertical values for minimum extremity control points 62A and mid-tone control points 62C for each of transfer functions 92R, 92G and 92B. The adjustment to the vertical value of mid-tone control point 62C may be scaled preserve both the pre-adjustment ratio of the vertical values of maximum extremity control point 64E and mid-tone control point 62C, and the pre-adjustment ratio of the vertical values of minimum extremity control point 64A and mid-tone control point 62C.

Manipulations of control 102CV adjust the vertical values for mid-tone control point 62C and one of minimum extremity control point 62A and maximum extremity control point 62E, for each of transfer functions 92R, 92G and 92B. The adjustment to the vertical value of the one of control points 62A and 62E may be scaled preserve both the pre-adjustment ratio of the vertical values of maximum extremity control point 64E and mid-tone control point 62C, and the pre-adjustment ratio of the vertical values of minimum extremity control point 64A and mid-tone control point 62C.

Manipulations of control 102EV adjust the vertical values for minimum extremity control point 62A and mid-tone control point 62C, for each of transfer functions 92R, 92G and 92B. The adjustment to the vertical value of mid-tone control point 62C may be scaled preserve both the pre-adjustment ratio of the vertical values of maximum extremity control point 64E and mid-tone control point 62C, and the pre-adjustment ratio of the vertical values of minimum extremity control point 64A and mid-tone control point 62C.

Manipulations of control 102AH adjust the horizontal values for minimum extremity control points 62A and mid-tone control points 62C for each of transfer functions 92R, 92G and 92B. The adjustment to the horizontal value of mid-tone control point 62C may be scaled preserve both the pre-adjustment ratio of the horizontal values of maximum extremity control point 64E and mid-tone control point 62C, and the pre-adjustment ratio of the horizontal values of minimum extremity control point 64A and mid-tone control point 62C.

Manipulations of control 102CH adjust the horizontal values for mid-tone control point 62C and one of minimum extremity control point 62A and maximum extremity control point 62E, for each of transfer functions 92R, 92G and 92B. The adjustment to the horizontal value of the one of control points 62A and 62E may be scaled preserve both the pre-adjustment ratio of the horizontal values of maximum extremity control point 64E and mid-tone control point 62C, and the pre-adjustment ratio of the horizontal values of minimum extremity control point 64A and mid-tone control point 62C.

Manipulations of control 102EH adjust the horizontal values for minimum extremity control point 62A and mid-tone control point 62C, for each of transfer functions 92R, 92G and 92B. The adjustment to the horizontal value of mid-tone control point 62C may be scaled preserve both the pre-adjustment ratio of the horizontal values of maximum extremity control point 64E and mid-tone control point 62C, and the pre-adjustment ratio of the horizontal values of minimum extremity control point 64A and mid-tone control point 62C.

When the vertical values mid-tone control point 62C and footroom control point 62B are the same and control 102CV is manipulated to downwardly adjust the vertical value of mid-tone control point 62C, both mid-tone control point 62C and footroom control point 62B are adjusted by the same amount.

When the vertical values mid-tone control point 62C and headroom control point 62D are the same and control 102CV is manipulated to upwardly adjust the vertical value of mid-tone control point 62C, both mid-tone control point 62C and headroom control point 62D are adjusted by the same amount.

When the horizontal values mid-tone control point 62C and footroom control point 62B are the same and control 102CH is manipulated to leftwardly adjust the horizontal value of mid-tone control point 62C, both mid-tone control point 62C and footroom control point 62B are adjusted by the same amount.

When the horizontal values mid-tone control point 62C and headroom control point 62D are the same and control 102CH is manipulated to rightwardly adjust the horizontal value of mid-tone control point 62C, both mid-tone control point 62C and headroom control point 62D are adjusted by the same amount.

In some embodiments, image colors are re-saturated to restore, at least approximately, the saturation lost as a result of tonal compression. Where tonal compression is not constant across the range of tones in an image, different levels of tonal compression applied to different tones results in different colors being de-saturated to different degrees. In general, the greater the amount of tonal compression, the greater the amount of de-saturation. The amount of tonal compression may be quantified by the log-log slope of the tone-curve. As an illustrative example, transfer function 60 in FIG. 3 has a steeper log-log slope in the substantially linear mid-tone region 64C than it does in the vicinity of minimum extremity control point 62A and maximum extremity control point 62E. Accordingly, tone compression going from the input (horizontal coordinate) to output (vertical coordinate) is greater in the vicinity of values 62A and 62E as compared with substantially linear mid-tone region 64C.

Applying a global re-saturation technique may re-saturate all pixels without regard to the amount of de-saturation caused by tonal compression. Some embodiments re-saturate transformed image data pixels according to the amount of tonal compression of the transformed image data pixels. Given that the amount of tonal compression corresponds to the log-log slope of the tone-curve, the amount of tonal compression for an input value $L_{in}$ may be determined as the derivative of the transfer function $L_{out}=f(L_{in})$ at the input value $L_{in}$. The log-log slope of this transfer function can be determined by setting $L_{in}=e^x$ and $L_{out}=e^y$ and solving for $dy/dx$, which represents the log-log slope. For a tone curve according to Equation (1) above, y may be expressed as:

$$y=\log(c_1+c_2 e^{nx})-\log(1+c_3 e^{nx}) \quad (4)$$

and the log-log slope $c(L_{in})$ at any point on the tone curve may be calculated as the derivative of y with respect to x at $L_{in}$:

$$c(L_{in}) = \frac{dy}{dx} = \frac{nL_{in}^n(c_2-c_1 c_3)}{(c_1+c_2 L_{in}^n)(1+c_3 L_{in}^n)} \quad (5)$$

For color channels R, G, and B, re-saturated drive values ($R_{re-sat}$, $G_{re-sat}$, $B_{re-sat}$) may be determined in terms of the normalized driving values as follows:

$$R_{re-sat} = R_{norm}\left(\frac{c_{in}}{L_{in}}\right)^{f(c)-c} \quad (6)$$

$$G_{re-sat} = G_{norm}\left(\frac{c_{in}}{L_{in}}\right)^{f(c)-c} \quad (7)$$

$$B_{re-sat} = B_{norm}\left(\frac{c_{in}}{L_{in}}\right)^{f(c)-c} \quad (8)$$

where f(c) is given as:

$$f(c) = \frac{(1+k_1)c^{k_2}}{1+k_1 c^{k_2}}$$

and $k_1$ and $k_2$ are constants. In some embodiments $k_1$=1.6474. In some embodiments, $k_1$=1.647. In some embodiments, $k_1$=1.68. In some embodiments (including without limitation some embodiments in which $k_1$=1.6474, $k_1$=1.647 or $k_1$=1.68) $k_2$=0.9925. In some embodiments (including without limitation some embodiments in which $k_1$=1.6474, $k_1$=1.647 or $k_1$=1.68) $k_2$=0.992. In some embodiments (including without limitation some embodiments in which $k_1$=1.6474, $k_1$=1.647 or $k_1$=1.68) $k_2$=0.99. It will be appreciated that acceptable results may be obtained using other values of $k_1$ and $k_2$. It will also be appreciated that re-saturated drive values, $R_{re-sat}$, $G_{re-sat}$ and $B_{re-sat}$ could be calculated based on the display linear luminance values for each of the red, green and blue color channels ($R_{out}$, $G_{out}$ and $B_{out}$).

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks are presented in a given order in the above examples, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software, hardware and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented using software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for color grading input video data for display on a target display, the method comprising:
   obtaining target display metadata indicative of a capability of the target display;
   obtaining input video data metadata indicative of image characteristics of the input video data;
   automatically determining initial values for parameters of a parameterized sigmoidal transfer function, at least one of the initial values based at least in part on at least one of the target display metadata and the input video data metadata; and,
   mapping the input video data to color-graded video data according to the parameterized transfer function specified using the initial values.

2. A method according to claim 1 wherein the parameters comprise a plurality of control points which characterize the parameterized sigmoidal transfer function.

3. A method according to claim 2 wherein the control points comprise a minimum extremity control point, a footroom control point, a mid-tone control point, a headroom control point, and a maximum extremity control point.

4. A method according to claim 1 comprising providing a control for manually adjusting a value of a first parameter, the control configured to, in response to a manual control adjustment, adjust the value of a first parameter and adjust a value of a second parameter by an amount proportional to the adjustment of the value of the first parameter.

5. A method according to claim 4 wherein the adjustment of the second parameter value is calibrated to maintain a pre-adjustment ratio among the first parameter value, the second parameter value and a value of a third parameter.

6. A method according to claim 1 wherein obtaining the input video data metadata comprises extracting input video data metadata from the input video data.

7. A method according to claim 6 wherein extracting input video data metadata from the input video data comprises computing a luminance statistic.

8. A method according to claim 7 wherein automatically determining the at least one of the initial values comprises determining a maximum extremity parameter based on the luminance statistic.

9. A method according to claim 7 wherein automatically determining the at least one of the initial values comprises determining a minimum extremity control parameter based on the luminance statistic.

10. A method according to claim 7 wherein automatically determining the at least one of the initial values comprises determining a mid-tone control parameter based on the luminance statistic.

11. A method according to claim 6 wherein extracting input video data metadata comprises obtaining a map of light sources for at least one frame of the input video data and determining a light source luminance threshold based on the map of light sources.

12. A method according to claim 11 wherein automatically determining the at least one of the initial values comprises determining a high range sharpness parameter based on the light source luminance threshold.

13. A method according to claim 6 wherein extracting input video data metadata comprises obtaining a low level noise threshold for the input video data.

14. A method according to claim 13 wherein automatically determining the at least one of the initial values comprises determining a low range sharpness parameter based on the low level noise threshold.

15. A method according to claim 1 wherein the input video data metadata comprises one or more video data acquisition parameters for the input video data.

16. A method according to claim 1 comprising obtaining an identification of a salient region of the input video data, and wherein obtaining the input video data metadata comprises extracting input video data metadata from the salient region.

17. Apparatus for color grading input video data for display on a target display, the apparatus comprising:
an input configured to receive input video data;
an initial parameter generator configured to generate initial values for parameters of a parameterized sigmoidal transfer function, wherein the parameters comprise a plurality of control points which characterize the parameterized sigmoidal transfer function, at least one of the initial values based at least in part on at least one of target display metadata indicative of a capability of a target display and input video data metadata indicative of image characteristics of the input video data; and,
a mapping unit configured to apply the parameterized sigmoidal transfer function characterized by the initial values to the input video data to generate color-graded video data.

18. Apparatus according to claim 17 wherein the control points comprise a minimum extremity control point, a footroom control point, a mid-tone control point, a headroom control point, and a maximum extremity control point.

19. Apparatus according to claim 17 comprising a control interface comprising a control for manually adjusting a value of a first parameter, the control configured to, in response to a manual control adjustment, adjust the value of a first parameter and adjust a value of a second parameter by an amount proportional to the adjustment of the value of the first parameter.

20. Apparatus according to claim 19 wherein the adjustment of the second parameter value is calibrated to maintain a pre-adjustment ratio among the first parameter value, the second parameter value and a value of a third parameter.

21. Apparatus according to claim 17 wherein the initial parameter generator is configured to extract input video data metadata from the input video data.

22. Apparatus according to claim 21 wherein the initial parameter generator is configured to extract input video data metadata from the input video data by computing a luminance statistic.

23. Apparatus according to claim 22 wherein the initial parameter generator is configured to automatically determine the at least one of the initial values by determining a maximum extremity parameter based on the luminance statistic.

24. Apparatus according to claim 22 wherein the initial parameter generator is configured to automatically determine the at least one of the initial values by determining a minimum extremity control parameter based on the luminance statistic.

25. Apparatus according to claim 22 wherein the initial parameter generator is configured to automatically determine the at least one of the initial values by determining a mid-tone control parameter based on the luminance statistic.

26. Apparatus according to claim 21 wherein the initial parameter generator is configured to obtain a map of light sources for at least one frame of the input video data and determine a light source luminance threshold based on the map of light sources.

27. Apparatus according to claim 26 wherein the initial parameter generator is configured to automatically determine the at least one of the initial values by determining a high range sharpness parameter based on the light source luminance threshold.

28. Apparatus according to claim 21 wherein the initial parameter generator is configured to obtain a low level noise threshold for the input video data.

29. Apparatus according to claim 28 wherein the initial parameter generator is configured to automatically determine the at least one of the initial values by determining a low range sharpness parameter based on the low level noise threshold.

30. Apparatus according to claim 17 wherein the input video data metadata comprises one or more video data acquisition parameters for the input video data.

31. Apparatus according to claim 17 wherein the initial parameter generator is configured to obtain an identification of a salient region of the input video data, and wherein obtaining the input video data metadata comprises extracting input video data metadata from the salient region.

* * * * *